(12) United States Patent
Li et al.

(10) Patent No.: US 9,894,726 B2
(45) Date of Patent: Feb. 13, 2018

(54) WALL-MOUNTED DISPLAY APPARATUS AND CONTROL METHOD THEREOF

(71) Applicant: BOE TECHNOLOGY GROUP CO., LTD., Beijing (CN)

(72) Inventors: Yanfu Li, Beijing (CN); Jing Yu, Beijing (CN); Xuewen Lv, Beijing (CN); Lang Liu, Beijing (CN); Zhigang Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/111,409

(22) PCT Filed: Dec. 17, 2015

(86) PCT No.: PCT/CN2015/097686
§ 371 (c)(1),
(2) Date: Jul. 13, 2016

(87) PCT Pub. No.: WO2017/031873
PCT Pub. Date: Mar. 2, 2017

(65) Prior Publication Data
US 2017/0231052 A1 Aug. 10, 2017

(30) Foreign Application Priority Data
Aug. 24, 2015 (CN) .......................... 2015 1 0524304

(51) Int. Cl.
*H05B 37/02* (2006.01)
*H05B 33/08* (2006.01)
*H04N 5/58* (2006.01)

(52) U.S. Cl.
CPC ........... *H05B 33/0854* (2013.01); *H04N 5/58* (2013.01)

(58) Field of Classification Search
CPC .............................. H05B 33/0854; H04N 5/58
(Continued)

(56) References Cited

U.S. PATENT DOCUMENTS 7,864,204 B2 * 1/2011 Overes ............... H05B 37/0218
345/102
8,770,815 B2 * 7/2014 Hardacker ............... H04N 5/64
362/16
(Continued)

FOREIGN PATENT DOCUMENTS

CN          1902915 A     1/2007
CN        101573968 A    11/2009
(Continued)

OTHER PUBLICATIONS

Written Opinion of the International Searching Authority from corresponding PCT Application No. PCT/CN2015/097686, dated Apr. 19, 2016 (5 pages).
(Continued)

*Primary Examiner* — Don Le
(74) *Attorney, Agent, or Firm* — Harness, Dickey & Pierce, P.L.C.

(57) ABSTRACT

The present invention provides a wall-mounted display apparatus and a control method thereof, the h devices are provided in edge areas of a back surface opposite to a light emitting surface of the display apparatus, and/or the plurality of light emitting devices are provided on edge side surfaces perpendicular to the light emitting surface of the display apparatus and are configured to emit light towards the rear of the display apparatus. The control method comprises controlling a plurality of light emitting devices to emit light upon the display apparatus is in operation. The wall-mounted display apparatus and control method thereof according to exemplary embodiments of the invention are capable of effectively eliminating or attenuating shadow
(Continued)

areas around a display apparatus, thereby avoiding influence on watching effect of the user.

10 Claims, 2 Drawing Sheets

(58) Field of Classification Search
USPC ............................................ 315/153
See application file for complete search history.

(56) References Cited

U.S. PATENT DOCUMENTS

| | | | |
|---|---|---|---|
| 2008/0031001 A1* | 2/2008 | Sun | F21S 8/00 362/427 |
| 2008/0297591 A1* | 12/2008 | Aarts | G06F 1/1601 348/51 |
| 2009/0016076 A1* | 1/2009 | Overes | H04N 9/73 362/612 |
| 2013/0121020 A1 | 5/2013 | Liu et al. | |

FOREIGN PATENT DOCUMENTS

| | | |
|---|---|---|
| CN | 101908212 A | 12/2010 |
| CN | 102027748 A | 4/2011 |
| CN | 102047035 A | 5/2011 |
| CN | 102518988 A | 6/2012 |
| CN | 203299690 U | 11/2013 |
| CN | 105101558 A | 11/2015 |
| WO | WO-2010047729 A1 | 4/2010 |

OTHER PUBLICATIONS

Office Action from corresponding Chinese Application No. 201510524304.2, dated Mar. 20, 2017 (7 pages).

* cited by examiner

WALL-MOUNTED DISPLAY APPARATUS AND CONTROL METHOD THEREOF

The present application claims the benefit and priority of Chinese Patent Application No. 201510524304.2, filed on Aug. 24, 2015, the entire content of which is incorporated herein by reference as a part of the present application.

FIELD

Exemplary embodiments of the present invention relate to a wall-mounted display apparatus and a control method thereof.

BACKGROUND

A flat panel television that is wall-mounted is desired by many users due to space saving and aesthetic appearance.

However, special attention should be paid when installing a wall-mounted television and it has high requirements on install environment, wall surface where the television is installed, install process, and so on. If the television is not properly installed, watching effect may be affected. As shown in FIG. 1, for a wall-mounted television, when a lamp in the room is turned on at night, since the television has certain thickness, there are necessarily some areas around the television where light cannot be reached, thus shadow will be left around the television, which will necessarily affect watching effect.

SUMMARY

A wall-mounted display apparatus and a control method thereof provided in accordance with exemplary embodiments of the present invention are capable of effectively eliminating shadow areas around a display apparatus, thereby avoiding influence on watching effect of the user.

According to a first aspect of the present invention, there is provided a wall-mounted display apparatus comprising a plurality of light emitting devices:

the plurality of light emitting devices are arranged in an edge area of a back surface opposite to a light emitting surface of the display apparatus; and/or the plurality of light emitting devices are arranged on a side surface perpendicular to the light emitting surface of the display apparatus and are configured to emit light towards the rear of the display apparatus.

According to an exemplary embodiment of the present invention, the wall-mounted display apparatus further comprising a control module and brightness sensors, wherein the brightness sensors are configured to obtain an intensity of ambient light; and wherein the control module is configured to generate a control signal to adjust brightness of the plurality of light emitting devices according to the obtained intensity of the ambient light.

According to an exemplary embodiment of the present invention, the brightness sensors are arranged on the side surface of the display apparatus perpendicular to the light emitting surface.

According to an exemplary embodiment, the plurality of light emitting devices are arranged in a left edge area, a right edge area and a lower edge area of the back surface.

According to an exemplary embodiment of the present invention, a plurality of light emitting devices are arranged in each of a left edge area, a right edge area and a lower edge area of the back surface, and the plurality of light emitting devices are arranged in same interval.

According to an exemplary embodiment, the brightness sensors are respectively arranged on a left side surface, a right side surface and a lower side surface of the display apparatus perpendicular to the light emitting surface;

the control module is further configured to adjust the brightness of the light emitting devices in the left edge area, the right edge area and the lower edge area respectively, according to the intensity of the ambient light obtained by each of the brightness sensors.

According to an exemplary embodiment of the present invention, the wall-mounted display apparatus further comprising a camera;

the camera is connected to the control module and configured to capture a user image;

the control module is further configured to determine a relative position of the user to the display apparatus according to the captured user image; to turn on the light emitting devices in the left edge area and the lower edge area and turn off the light emitting devices in the right edge area in response to determining that the user is located at the left to a central axis of the display apparatus; and to turn on the light emitting devices in the right edge area and the lower edge area and turn off the light emitting devices in the left edge area in response to determining that the user is located at the right to the central axis of the display apparatus.

According to an exemplary embodiment of the present invention, the control module is configured to turn on the light emitting devices in the left edge area, the right edge area and the lower edge area in response to determining that the user is located in front of the central axis of the display apparatus.

According to a second aspect of the present invention, there is provided a control method for a wall-mounted display apparatus, comprising:

controlling a plurality of light emitting devices to emit light upon the display apparatus is in operation;

wherein, the plurality of light emitting devices are arranged in an edge area of a back surface opposite to a light emitting surface of the display apparatus, and/or the plurality of light emitting devices are arranged on a side surface perpendicular to the light emitting surface of the display apparatus and are configured to emit light towards the rear of the display apparatus.

According to an exemplary embodiment, the method further comprising:

obtaining, by brightness sensors, an intensity of ambient light; and generating a control signal to adjust brightness of the plurality of light emitting devices according to the obtained intensity of the ambient light.

According to an exemplary embodiment, the plurality of light emitting devices are arranged in a left edge area, a right edge area and a lower edge area of the back surface, and the method further comprising:

capturing a user image by a camera, and determining a relative position of the user to the display apparatus according to the user image;

turning on the light emitting devices in the left edge area and the lower edge area and turning off the light emitting devices in the right edge area, in response to determining that the user is located at the left to a central axis of the display apparatus;

turning on the light emitting devices in the right edge area and the lower edge area and turning off the light emitting devices in the left edge area, in response to determining that the user is located at the right to the central axis of the display apparatus.

According to an exemplary embodiment of the present invention, the method further comprising: turning on the light emitting devices in the left edge area, the right edge area and the lower edge area, in response to determining that the user is located in front of the central axis of the display apparatus.

It can be seen from the above technical solution that, the present invention provides a wall-mounted display apparatus and a control method thereof, by providing a plurality of light emitting devices in edge areas of a back surface opposite to a light emitting surface of the display apparatus to irradiate shadow areas around the display apparatus, the shadow areas around the display apparatus can be effectively eliminated, thereby avoiding influence on watching effect of the user.

DRAWINGS

To illustrate embodiments of the invention or technical solutions in the prior art more clearly, drawings need to be used in describing the embodiments or the prior art will be introduced briefly, apparently, the drawings in the following description are merely some embodiments of the invention, and other drawings may be obtained from these drawings by a person skilled in the art without paying any inventive work.

DETAILED DESCRIPTION

Hereinafter, technical solutions of embodiments of the invention will be described clearly and completely in conjunction with drawings in embodiments of the invention. Apparently, the described embodiments are just part of rather than all of the embodiments of the invention. Based on the described embodiments, all other embodiments obtained by those skilled in the art without any inventive work are within protection scope of the invention.

In description of the invention, it should be noted that, orientation or positional relationship indicated by terms such as "up", "down", "top" and "bottom" are orientation or positional relationship shown based on the drawings. These terms are only for convenience of description and for simplifying description, and do not indicate or imply that the apparatus or element referred to must have particular orientation, being constructed or operated in particular orientation, thus, they should not be construed to be limitation on the present invention.

It should be appreciated that the wall-mounted display apparatus related to the present application is generally a television, but it may also be a display forming a set with a computer or other device having display function.

Figure 1:
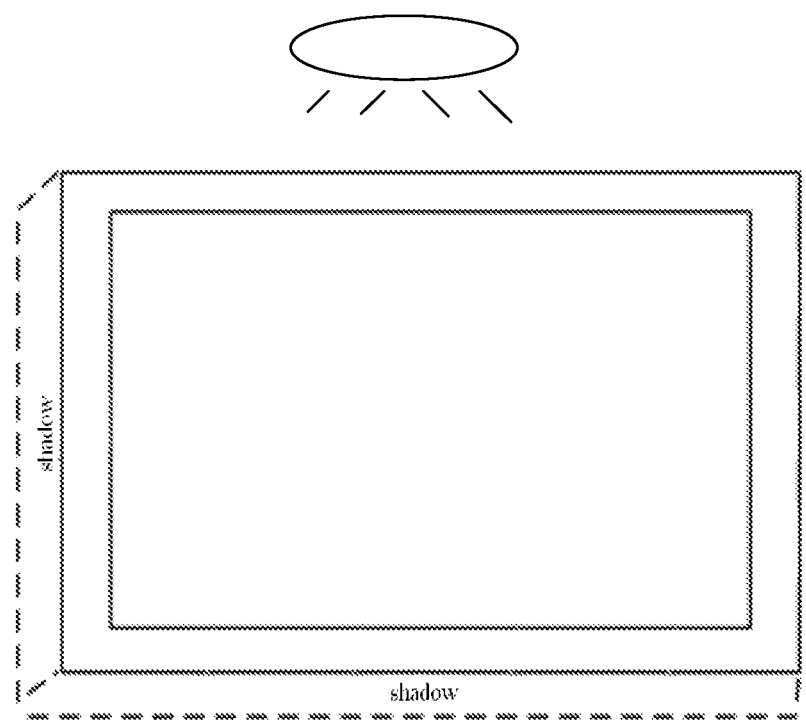
FIG. 1 is a schematic diagram of an existing wall-mounted television when being irradiated by a lamp.
Figure 2:
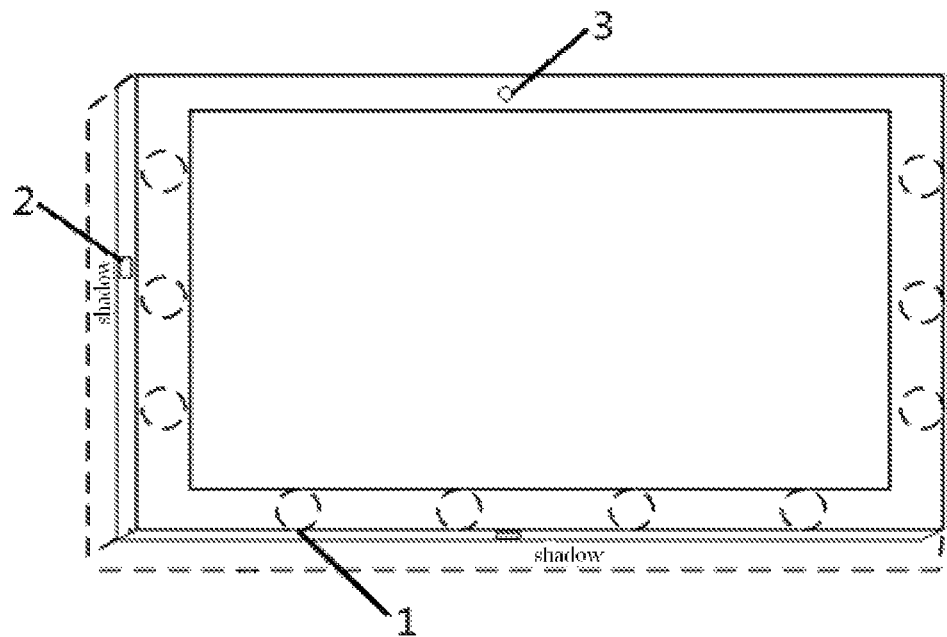
FIG. 2 is a schematic diagram of a wall-mounted display apparatus provided in accordance with an embodiment of the present invention.

FIG. 2 shows a schematic diagram of a wall-mounted display apparatus provided in accordance with an embodiment of the present invention. As shown in FIG. 2, the wall-mounted display apparatus comprises a plurality of light emitting devices 1, and the plurality of light emitting devices 1 are arranged in an edge area of a back surface opposite to a light emitting surface of the display apparatus, wherein the light emitting devices 1 may be LED lamps. Specifically, as shown in FIG. 2, the plurality of light emitting devices 1 are arranged in each of a left edge area, a right edge area and a lower edge area on the back surface of the display apparatus, and the plurality of light emitting devices 1 are arranged in same interval, for example, three light emitting devices 1 arranged in equal interval are arranged in the left and right edge areas, respectively, and four light emitting devices 1 arranged in equal interval are arranged in the lower edge area.

In addition, at least one brightness sensor 2 may be arranged on the side surface perpendicular to the light emitting surface, and at least one camera 3 may be arranged in an edge area on a side surface where the light emitting surface is located, for example, the camera 3 is arranged at central position of an upper edge area on the side surface where the light emitting surface is located. The brightness sensor 2 and the camera 3 will be further described later.

In another embodiment, the plurality of light emitting devices 1 may also be arranged on a side surface perpendicular to the light emitting surface of the display apparatus and are configured to emit light towards the rear of the display apparatus.

It can be seen from above that upon the display apparatus is in operation, the plurality of light emitting devices 1 are turned on to irradiate shadow areas around the display apparatus, thus shadow areas can be effectively eliminated or attenuated, and influence on watching effect of the user caused by the shadow areas can be avoided.

Figure 3:
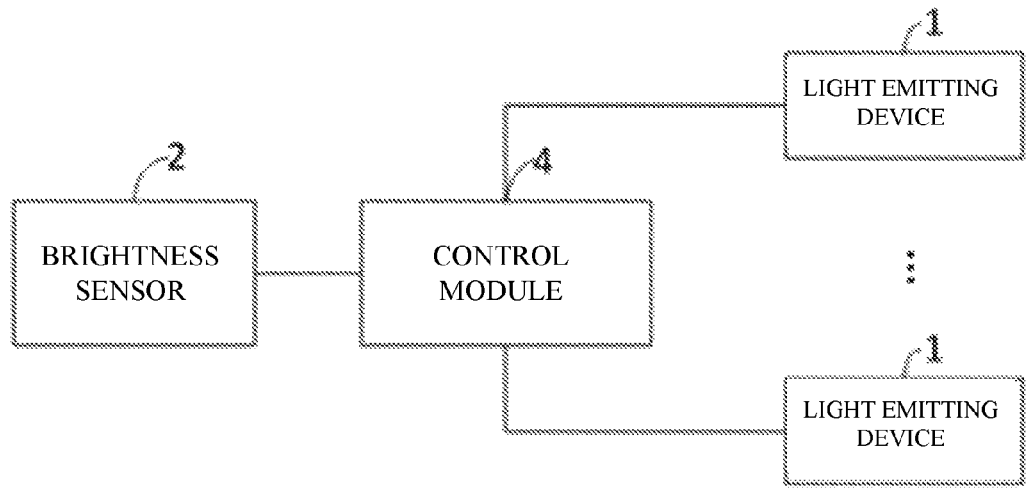
FIG. 3 is a structural block diagram of a wall-mounted display apparatus provided in accordance with another embodiment of the present invention.

In an exemplary implementation of the present embodiment, as shown in FIG. 3, in addition to the plurality of light emitting devices 1, the wall-mounted display apparatus further comprises a control module 4 and a brightness sensor 2, wherein the brightness sensor 2 is configured to obtain an intensity of ambient light, and the control module 4 is configured to generate a control signal to adjust brightness of the plurality of light emitting devices 1 according to the obtained intensity of the ambient light. As such, light intensity of the plurality of light emitting devices 1 may be made identical or close to that of the ambient light, thus shadow areas can be eliminated or attenuated, influence on watching effect of the user caused by the shadow areas can be reduced or eliminated, and user experience can be improved.

It can be seen from above that, brightness of the plurality of light emitting devices 1 may be varied with intensity of the ambient light. For example, when intensity of the ambient light detected by the brightness sensor 2 is zero, which indicates that there is no shadow area around the display apparatus, the control module 4 is configured to control the plurality of light emitting devices 1 to be turned off. When intensity of the ambient light is gradually increased, shadow appears around the display apparatus accordingly, at this time, the control module 4 is configured to output pulse width modulated (PWM) signals having different duty cycles to control brightness of the plurality of light emitting devices 1, so as to eliminate shadow in corresponding areas.

As shown in FIG. 2, the brightness sensor 2 may be arranged on a side surface of the display apparatus perpendicular to the light emitting surface. As such, light intensity around the shadow areas can be more accurately detected by the brightness sensor 2, and thus brightness of the plurality of light emitting devices 1 can be more accurately adjusted, so as to eliminate the shadow areas.

According to an exemplary embodiment of the present invention, the plurality of light emitting devices 1 may be arranged in edge areas on at least three sides of a back surface opposite to the light emitting surface of the display apparatus, e.g. left edge area, right edge area, and lower edge area. In case that an ambient lamp is turned on above the display apparatus, shadow areas mainly appear at left, right and lower side of the display apparatus, therefore, by providing the plurality of light emitting devices 1 at corresponding positions, shadow can be eliminated more effectively.

Since intensity of ambient light at different sides of the edge of the display apparatus are slightly different, in order to better eliminate shadow areas, according to an exemplary embodiment of the present invention, there may be provided three brightness sensors 2, and the three brightness sensors 2 are arranged on a left side surface, right side surface and lower side surface of the display apparatus perpendicular to the light emitting surface, respectively.

Accordingly, the control module 4 is further configured to adjust the brightness of the light emitting devices 1 in the left edge area, the right edge area and the lower edge area respectively, according to an intensity of the ambient light obtained by each of the brightness sensors 2, wherein the control module may be a microcontroller unit (MCU), a single chip computer, a DSP, etc.

Figure 4:
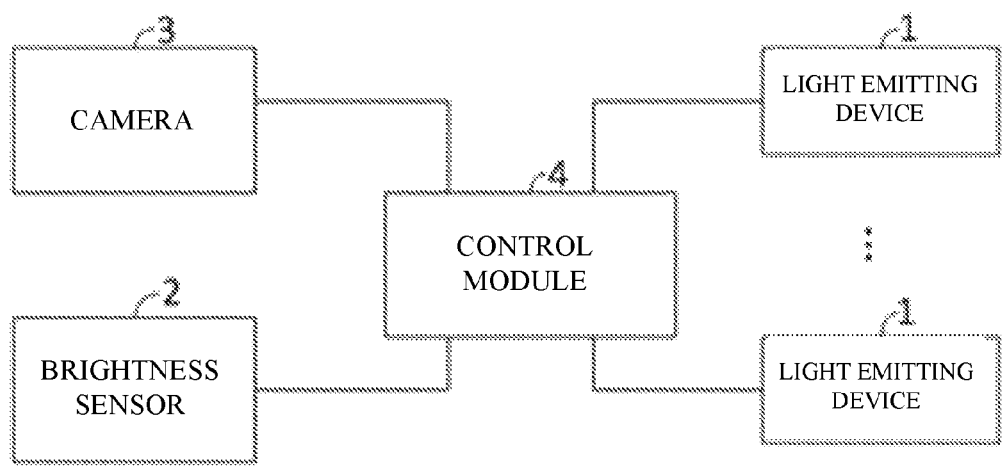
FIG. 4 is a structural block diagram of a wall-mounted display apparatus provided in accordance with still another embodiment of the present invention.

In conjunction with FIG. 2 and FIG. 4, in addition to the plurality of light emitting devices 1, the brightness sensors 2 and the control module 4 in the above embodiment, the wall-mounted display apparatus according to the exemplary embodiment of the present invention may further comprise a camera 3.

Specifically, the camera 3 is connected to the control module 4 and is configured to capture a user image. Accordingly, the control module 4 is further configured to determine a relative position of the user to the display apparatus according to the captured user image; to turn on the light emitting devices 1 in the left edge area and the lower edge area and turn off the light emitting devices 1 in the right edge area in response to determining that the user is located at the left to a central axis of the display apparatus; and to turn on the light emitting devices 1 in the right edge area and the lower edge area and turn off the light emitting devices 1 in the left edge area in response to determining that the user is located at the right to the central axis of the display apparatus; in addition, to turn on the light emitting devices 1 in the left edge area, the right edge area and the lower edge area in response to determining that the user is located in front of the central axis of the display apparatus. In some exemplary embodiments, the light emitting devices 1 in the left edge area, the right edge area and the lower edge area are turned on in response to determining that there is a plurality of users.

It is appreciated that, for a wall-mounted display apparatus irradiated from above, shadow areas that can be seen by the user generally appear in left, right and lower area of the display apparatus. When the user is watching from left of the central axis of the display apparatus, shadow at right will not have influence on visual experience of the user, thus the light emitting devices at the right may be turned off, and only the light emitting devices at the left and lower side need to be adjusted. Similarly, when the user is watching from right of the central axis of the display apparatus, shadow at left will not have influence on visual experience of the user, thus the light emitting devices at the left may be turned off, and only the light emitting devices at the right and lower side need to be adjusted. As such, corresponding light emitting devices are turned on or off based on a relative position of the user to the display apparatus, not only watching effect of the user will not be affected, but also electric energy can be effectively saved, thereby avoiding unnecessary waste.

Another exemplary embodiment of the present invention provides a control method for a wall-mounted display apparatus, the method comprises the steps of:

controlling a plurality of light emitting devices to emit light upon the display apparatus is in operation, wherein, the plurality of light emitting devices are arranged in an edge area of a back surface opposite to a light emitting surface of the display apparatus; and in another embodiment, the plurality of light emitting devices may also be arranged on a side surface perpendicular to the light emitting surface of the display apparatus and may be configured to emit light towards the rear of the display apparatus.

According to an exemplary embodiment of the present invention, the wall-mounted display apparatus may further comprise a brightness sensor and a controlling module, and the method may further comprise the steps of:

S11: obtaining, by the brightness sensor, an intensity of ambient light;

S12: generating a control signal to adjust brightness of the plurality of light emitting devices according to the obtained intensity of the ambient light. As such, light intensity of the plurality of light emitting devices are made identical or close to the obtained intensity of the ambient light, that is, when there is no shadow area around the display apparatus, the obtained intensity of the ambient light is zero, and at this time, corresponding light emitting devices 1 are turned off; when shadow appears around the display apparatus, the obtained intensity of the ambient light increases accordingly, and at this time, brightness of the plurality of light emitting devices are increased accordingly to eliminate shadow in the corresponding areas. It can be seen from above that, by adjusting light intensity of the light emitting devices to be identical or close to intensity of the ambient light, shadow areas are eliminated or attenuated, influence on watching effect of the user by the shadow areas are reduced or eliminated, thereby improving user experience.

Specifically, when the plurality of light emitting devices are arranged in left edge area, right edge area and lower edge area of a back surface of the display apparatus, three brightness sensors may be respectively arranged on left side surface, right side surface and lower side surface of the display apparatus perpendicular to the light emitting surface. As such, brightness of the light emitting devices in the left edge area, the right edge area, and the lower edge area are adjusted respectively based on an intensity of the ambient light obtained by each of the brightness sensors, thus shadow areas corresponding to different sides of the display apparatus can be eliminated more effectively.

Furthermore, when the wall-mounted display apparatus is provided with a camera, the method may further comprise the steps of:

S21: capturing a user image by the camera, and determining a relative position of the user to the display apparatus according to the user image;

S22: turning on the light emitting devices in the left edge area and the lower edge area and turning off the light emitting devices in the right edge area, in response to determining that the user is located at the left to a central axis of the display apparatus;

S23: turning on the light emitting devices in the right edge area and the lower edge area and turning off the light emitting devices in the left edge area, in response to determining that the user is located at the right to the central axis of the display apparatus; and S24: turning on the light emitting devices 1 in the left edge area, the right edge area and the lower edge area, in response to determining that the user is located in front of the central axis of the display apparatus.

In some exemplary embodiments, the light emitting devices 1 in the left edge area, the right edge area and the lower edge area are turned on in response to determining that there is a plurality of users.

As such, corresponding light emitting devices are turned on or off based on a relative position of the user to the display apparatus, not only watching effect of the user will not be affected, but also electric energy can be effectively saved, thereby avoiding unnecessary waste.

The foregoing is merely detailed embodiments of the invention, however, protection scope of the invention is not limited thereto, within technical scope disclosed by the present invention, variations or substitutions readily occurred to a person skilled in the art should be covered by the protection scope of the invention. Therefore, protection scope of the invention should be defined by accompany claims.

What is claimed is:

1. A wall-mounted display apparatus comprising:
   a plurality of light emitting devices arranged in a left edge area, a right edge area and a lower edge area of a back surface opposite to a light emitting surface of the display apparatus;
   a camera configured to capture an image of a user watching the display apparatus; and
   a control module connected to the camera, the control module configured to determine a relative position of the user with respect to the display apparatus according to the captured image, to enable the light emitting devices in the left edge area and the lower edge area and disable the light emitting devices in the right edge area in response to determining that the user is located to the left of a central axis of the display apparatus, and to enable the light emitting devices in the right edge area and the lower edge area and disable the light emitting devices in the left edge area in response to determining that the user is located to the right of the central axis of the display apparatus.

2. The wall-mounted display apparatus according to claim 1 further comprising:
   a plurality of brightness sensors configured to obtain an intensity of ambient light, wherein the control module is configured to generate a control signal to adjust brightness of the plurality of light emitting devices according to the obtained intensity of the ambient light.

3. The wall-mounted display apparatus according to claim 2, wherein the plurality of brightness sensors are arranged on a side surface of the display apparatus perpendicular to the light emitting surface.

4. The wall-mounted display apparatus according to claim 1, further comprising a plurality of additional light emitting devices arranged on a side surface perpendicular to the light emitting surface of the display apparatus and configured to emit light towards the rear of the display apparatus.

5. The wall-mounted display apparatus according to claim 2, wherein the plurality of light emitting devices are arranged in same interval.

6. The wall-mounted display apparatus according to claim 1, wherein:
   the plurality of brightness sensors are respectively arranged on a left side surface, a right side surface and a lower side surface of the display apparatus perpendicular to the light emitting surface; and
   the control module is further configured to adjust the brightness of the light emitting devices in the left edge area, the right edge area and the lower edge area, respectively, according to the intensity of the ambient light obtained by each of the brightness sensors.

7. The wall-mounted display apparatus according to claim 1, wherein the control module is configured to enable the light emitting devices in the left edge area, the right edge area and the lower edge area in response to determining that the user is located in front of the central axis of the display apparatus.

8. A control method for a wall-mounted display apparatus according to claim 1, the method comprising:
   controlling the plurality of light emitting devices of the display apparatus to emit light upon the display apparatus during operation;
   capturing, by the camera, an image of a user watching the display apparatus;
   determining a relative position of the user with respect to the display apparatus according to the image;
   enabling the light emitting devices in the left edge area and the lower edge area and disabling the light emitting devices in the right edge area, in response to determining that the user is located to the left of the central axis of the display apparatus; and
   enabling the light emitting devices in the right edge area and the lower edge area and disabling the light emitting devices in the left edge area, in response to determining that the user is located to the right of the central axis of the display apparatus.

9. The control method according to claim 8, further comprising:
   obtaining, by the plurality of brightness sensors, an intensity of ambient light; and
   generating a control signal to adjust brightness of the plurality of light emitting devices according to the obtained intensity of the ambient light.

10. The control method according to claim 8 further comprising:
    turning on the light emitting devices in the left edge area, the right edge area and the lower edge area, in response to determining that the user is located in front of the central axis of the display apparatus.

* * * * *